Sept. 11, 1962 L. T. KNOCKE 3,053,545
PISTON RINGS AND METHODS OF MANUFACTURE
Filed Feb. 29, 1960 2 Sheets-Sheet 1
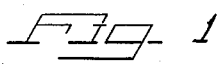
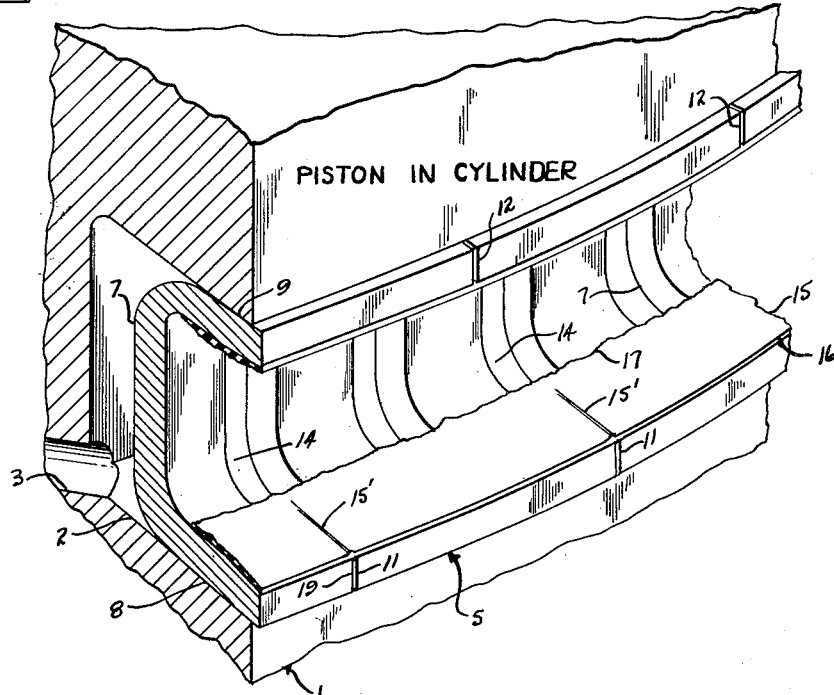
 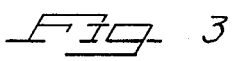
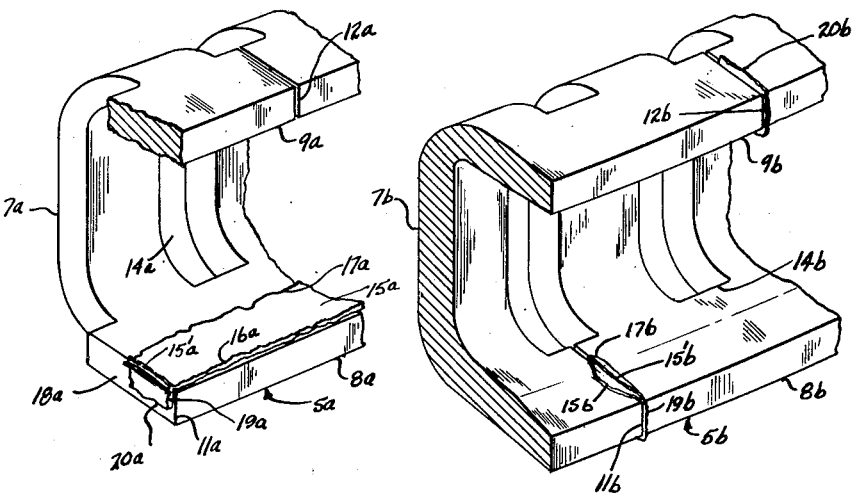
Inventor
Louis T. Knocke Sept. 11, 1962 L. T. KNOCKE 3,053,545
PISTON RINGS AND METHODS OF MANUFACTURE
Filed Feb. 29, 1960 2 Sheets-Sheet 2
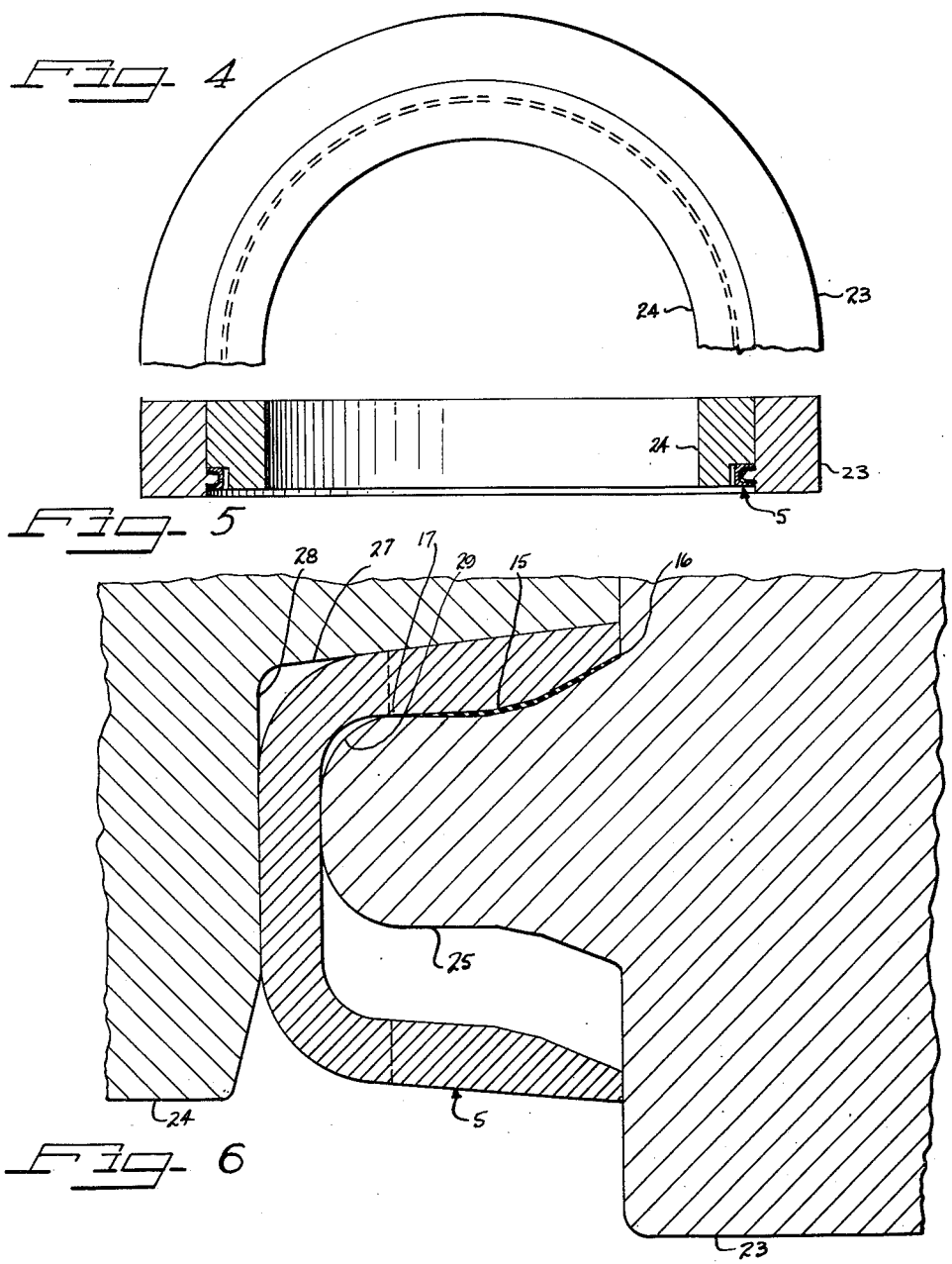
Inventor
Louis T. Knocke

United States Patent Office 3,053,545
Patented Sept. 11, 1962

3,053,545
PISTON RINGS AND METHODS OF
MANUFACTURE
Louis T. Knocke, Birmingham, Mich., assignor to Thompson Ramo Wooldridge Inc., Cleveland, Ohio, a corporation of Ohio
Filed Feb. 29, 1960, Ser. No. 11,808
21 Claims. (Cl. 277—202)

This invention relates to the sealing of potential leakage paths in expansible and contractible packing members without interfering with operation of the members. Specifically this invention relates to piston rings of the circumferentially resilient or garter spring type having gaps or slits sealed with an elastomer and to methods of sealing such rings.

While the invention will hereinafter be specifically described as embodied in circumferentially resilient oil control piston rings, it should be understood that the principles of this invention are generally applicable to packing members or seals and therefore the scope of this invention is not limited to the specific illustrated embodiments.

Circumferentially resilient oil control piston rings are generally formed from spring steel sheets or ribbons and have circumferential crowns or segments connected by legs or webs. In some forms the segments or crowns support separate rail rings which are urged against the side walls of the piston groove and against the cylinder wall by lips or shoulders on the resiliently expandable ring. In other forms the crowns or segments directly engage the side walls of the piston ring grooves and ride on the cylinder walls. In all forms of this type of oil control ring, however, potential leakage paths exist between the segments, legs, and webs to accommodate the required relative movement between adjacent portions. These paths of course will widen as the ring wears and must additionally expand circumferentially to maintain sealing relationship with the cylinder wall.

Attempts to seal these paths by other means have not been entirely satisfactory. Oil consumption, especially in engines which operate at high manifold vacuum is increased by oil flow through these leakage paths and it is therefore highly desirable that these paths be sealed without appreciably changing the characteristics of the piston ring.

Therefore, according to this invention, the potential leakage paths between adjacent segments of circumferentially expansible packing rings are sealed with an elastomer, such as a synthetic rubber or other plastic capable of resisting the high temperatures and corrosive atmospheres in which the packing ring must operate, as well as the solvent effects of the lubrication oil and the fuel. The elastomer is preferably bonded, as by vulcanization, to the metal segments of the ring and is applied when the ring is in a circumferentially contracted condition preferably intermediate the contracted operating diameter and the expanded free state diameter. This is desirable to minimize squeezing of the elastomer when the ring is contracted to its smallest service diameter and to minimize excessive stretching of the elastomer when the ring is expanded to or beyond its free diameter. This compression of the elastomer in its service condition should be less in the cases of wider slits and of slits with relatively less bonded areas.

In one form of the invention the elastomer is applied as a ribbon covering one face of the segments. In another form, the elastomer merely spans the space between adjacent segments. It will of course be apparent that various types of elastomers may be used for different types of packing conditions or engine applications. Examples of presently preferred materials for piston ring use are solvent resisting fluorocarbon silicone rubbers, typified by Dow Corning Corporation's "Silastics" such as LS–63, LS–53 and S–2034 or materials such as General Electric Company's silicone rubbers of similar bonding strength, temperature stability, and corrosion resistance. The elastomers must of course be firmly bondable to the metal and sufficiently elastically yieldable so as not to impede the spring characteristics of the metal, although it should of course be understood that under some conditions the elastomer can be stiff enough to modify the spring characteristics of the ring.

It is then an object of this invention to provide segmented packing members having potential leakage paths between the segments thereof sealed with elastomers.

Another object of this invention is to provide packing rings of the circumferentially expansible and contractible type wherein potential leakage paths in the rings are sealed with an elastomer which does not materially impede the circumferential expansibility and contractibility of the ring.

Another object of this invention is to provide a piston ring of the circumferentially resilient type having ring segments sealed in relatively movable relation by elastomeric bonds.

Still further objects of this invention are to provide a metal oil control piston ring of the garter spring type wherein adjacent ring segments are sealed by non-metallic elastomers and to provide methods of sealing such rings.

A still further object of this invention is to provide a piston ring of the segmented circumferentially resilient type having adjacent segments sealed in relatively movable relation with elastomers.

A still further object of this invention is to provide an oil control piston ring having circumferentially expansible and contractible slots between adjacent ring segments sealed by a non-metallic rubber-like material bonded to the segments.

Other and further objects of this invention will be apparent to those skilled in this art from the following detail description of the annexed sheets of drawings illustrating several examples of the invention.

In the drawings:

FIGURE 1 is a broken away, and partially sectioned, perspective view showing a portion of an engine piston and a segmental resiliently expansible, piston ring sealed according to this invention, in its ring groove, and held compressed by a non-illustrated cylinder bore; and FIGURE 2 is a partially sectioned and broken away perspective view similar to FIGURE 1 but showing only a portion of the same type of piston ring having a different or second embodiment of the sealing means;

FIGURE 3 is a partially sectioned and broken away perspective view like FIGURE 2 but showing still another or third form or embodiment of the sealing means;

FIGURE 4 is a partial plan view of apparatus to illustrate a simplified method and means for carrying out this invention;

FIGURE 5 is a diametrical and vertical sectional view taken through the apparatus of FIGURE 4; and FIGURE 6 is a view like FIGURE 5, but to an enlarged scale, showing only a portion of the apparatus of FIGURE 5 with the partly sealed piston ring in place therein.

In the exemplary embodiment of FIGURE 1, a portion of a conventional automobile engine piston is designated as a whole by 1. Only one of its piston ring grooves, such as 2, is shown with its conventional oil drainage hole or passage 3. The oil control type of piston ring, which is designated as a whole by 5, is mounted in this groove. For the sake of clarity, the ring is shown as projecting out beyond the piston by an exaggerated amount in FIGURE 1 since this figure (as indicated by the legend thereon) is considered as showing the piston and its ring as being in, and confined by, the cylinder bore, that is, the ring is in its installed condition. Thus, the piston ring and its sealing material are held compressed and flush by the cylinder in this service condition.

The ring 5 is of the resiliently expansible and one-piece type which has a generally U-shaped cross-section with bight or bottom 7 facing radially inwardly and its sides or legs providing lower and upper side rails 8 and 9 respectively with flat outer faces to closely engage the corresponding side walls of the ring groove 2. It is to be noted that these flat outer faces may diverge slightly toward their outer and cylinder bore engaging ends.

This one-piece and conventionally split ring supplies its own expansion spring since its sides 8 and 9 have slits 11 and 12 respectively extending completely through each side-wall or side-rail to provide independent segments or crowns. The slits in the respective rails are offset from each other as shown and the legs 7 of the bight connect the segments into the two axially spaced rows of rails 8 and 9 to provide a resiliently expansible, one-piece, garter spring member which is highly flexible, twistable and bendable so that it can readily and rapidly accommodate itself to, and fit, variations and distortions in the cylinder bore and rapidly match conditions of piston rock. It will also be noted that this ring provides its own lateral or transverse resilient expansion to hold its side rails spaced apart and in position relative to the side walls of the piston groove. Preferably there is some clearance (approximately 0.0003 inch in the specific exemplary embodiment hereof) between these side rails and the side walls of the piston groove.

The radially and peripherally extending segments defined by the narrow slits 11 and 12 are formed to engage both the cylinder bore at their radially outer faces and also to engage the side walls of the piston groove at their side faces. The segments are interconnected from side to side by narrower, or partially cut-away, bight portions 7 which form the bottom of the U cross-section. These narrow portions 7 are spaced by openings 14 which provide adequate area for free oil drainage into the bottom or base of the groove and from thence out through the oil drainage opening 3.

It will be noted, that the slits 11 and 12 are quite narrow relative to their other dimensions or their length and breadth. For example, FIGURE 1 (as well as the other figures hereof) may be considered as illustrating an automobile oil control ring having a top to bottom dimension or width of about 3/16" and made to fit a 4 1/8" diameter cylinder. This ring has an unsealed and free state or uninstalled diameter of 4 1/4". There are 59 slits around its periphery in each of its side-rails. These slits are about 0.008" in width so that when the ring is completely compressed the circumference will be shortened by about 0.472". A 4 1/8" bore has a 12.95" circumference, a 4 1/4" bore has a 13.35" circumference and the difference is .040". Thus, the slit width, when the ring is in the cylinder, or is installed, is only about 0.0012". It will be noted here that there is a compression or reduction in width (and volume) of the slits of nearly 8 to 1 from their unsealed free state to their installed condition.

It will also be noted that even in their expanded width, these slits hold water, and even gasoline, due to capillary action and it is difficult to expel such liquids even by compressing the ring completely. This capillary action also helps to retain the bonded in, sealing material in the slits during the repeated deformations or squeezing out actions in service.

As is noted above, it is not preferred to have the slits compressed or reduced in volume too much from the diameter at which a suitable sealing elastomer is bonded in place and vulcanized. Accordingly, in the above example, the ring would be held at a diameter materially less than its unsealed free state diameter but larger than its installed diameter. Due to the relatively lower surface tension forces and to the lower ratios of bonded areas to volumes, such service condition compressions of the elastomers should be less than for very narrow slits.

In FIGURE 1, the slits 11 and 12 are completely filled with a suitable elastomer. This sealing material in the slits has the radially outer ends 19 which are held substantially flush with the radially outer surfaces of the piston ring segment by engagement with the cylinder bore. Similarly the lateral outer side faces of the slit sealing elastomer are held substantially flush with the side faces of the side-rails of the piston ring by the piston groove side-walls.

In this FIGURE 1, the sealing elastomer may extend or protrude radially inward from the open radially inward ends of the slits 11 and 12 due to an excess squeezed out during the initial pressing in of the elastomer and also due to the compression of the sealing material when the ring is compressed as it is inserted into the cylinder bore. The sealing material in the slits is integrally or continuously connected to a layer of sealing material 15 which extends completely around each of the two inner faces of the side rails of the ring. This film or layer may have a width approximately equal to that of the inner faces. The installation compression will bulge in the film 15 over the slits as shown at 15'.

However, as shown in FIGURE 1, not only the sealing elastomer in the slits, but the integrally connected layer portion 15, extends radially inwardly from the radially inner ends of slits 11, or from openings 14, to an inner boundary 17 which may be irregular if desired. These inward projections will not be objectionable unless they materially close up openings 14 or impede inward oil drainage.

The thickness of this continuous film or layer (which, as noted above, aids materially in increasing the bonded area and in other ways) is not critical so long as it does not interfere materially with the drainage of oil through the openings 14. However, this thickness is preferably of the same order of magnitude as that of the sealing elastomer in the slits 11 and 12 before they are compressed.

Also it will be understood that the layer 15 may be partly or entirely discontinuous insofar as it is connected between the elastomer in the several slits. Even if discontinuous, it will serve to materially increase the bonded areas.

FIGURES 4, 5 and 6 show an elementary or simple apparatus as one example of a method and means for sealing oil control piston rings according to this invention. In these figures, the outer clamp or press ring 23 has an inward extension 25 shaped as shown to match the inner side faces of the ring rails and also to engage against the bottom of the U portion of the piston ring.

The internal or male element 24 has a cut-away portion as shown to form walls 27 and 28. The wall 27 is sloped as shown to fit and engage against the outer face of the ring rail while the wall 28 is machined to fit the radially inner bottom of the U of the piston ring.

Portion 25 is chamfered or rounded as shown at 29 so that it does not engage all the way up into the corners of the U-shaped cross-section of the ring.

There is a suitably narrow space between the side of the inner projection 25 and the side rail of the ring to provide for the desired thin layer or film of the rubber-like sealing material as shown at 15 in FIGURE 6, which illustrates the sealing elastomer after it has been forced into the slit and the thin film or layer at 15 has been formed. In this FIGURE 6, the thickness of the film or layer at 15 is exaggerated materially for the sake of clarity.

It will be noted that the sealing material is, preferably, effectively confined on all surfaces (or in all directions) by the ring itself and by members 23, 24 and 25 with the exception of the radially open inner ends of the slits. When the slits are filled under sufficient pressure, sealing elastomer may be forced inward from these inner ends of the slits, such inwardly extruded portions will not be objectionable since they do not engage the side walls of the ring groove nor will they interfere with adequate oil drainage through the openings 14 unless they are quite large.

An exemplary method to be employed in connection with the embodiment of FIGURE 1 may include an initial and suitable cleaning of the previously finished, oil control piston ring. This cleaning may be by any suitable materials (such as perchlorethylene followed by acetone) although in the present case a cleaning and degreasing by carbon tetrachloride is preferred.

After this cleaning, all of the surfaces to which the sealing material are to be bonded, are coated with a suitable adhesive primer which is compatible with or cooperates well with, the sealing material to be used. In this caes Dow Corning Corporation's or the silicate primer A-094 is coated on to these surfaces and dried in any conventional or convenient manner as will be understood by those skilled in this art.

In this particular example, the preferred sealing material may be considered as being the above noted Dow Corning Corporation's "Silastic" LS-63.

It is to be understood that the sealing elastomer (which is to be forced into the ring slits in its unset or unvulcanized and viscous or flowable form) may be initially applied in any conventional or desired manner as by being painted, sprayed, rolled or otherwise applied. It is preferred, in this case, to apply this soft or extrudable material in the form of a continuous strip tape, or layer having a suitable thickness or volume to provide enough, or a slight excess of, material to fill the slits and form the side face film 15.

One such layer or strip of the soft or extrudable sealing elastomer is placed on, and along, the inner face of the previously primed ring. The ring is then inserted in the press as shown in FIGURE 6 and heat and pressure are applied to force or extrude the soft and flowable sealing material into the slits as described above and to form the film 15.

As an example only for the Silastic LS-63, the press molding cycle time here may be five minutes at 240 to 260° F. Thereafter, the ring (with the sealing material in place) may be cured, as in an oven, at the proper vulcanizing temperature and for the proper period of time in order to fully set this rubber-like material and to increase its resistance to temperatures. In this case the vulcanizing temperature may be about 392° F. for a period of 8 hours.

It is to be understood that the elastomer is preferably cold-pressed into place and then the ring (with the elastomer in place in its slits) separately cured in an oven at the proper vulcanizing temperatures. However, in order to avoid the danger of tearing the sealing material in its raw or uncured state by having it stick to the fixtures, in certain cases the elastomer is hot pressed into the fixture prior to the heat curing.

It is preferred to hold the piston ring compressed, (as described above) during both the initial or preliminary molding and the final curing of most of it. The ring may be held so compressed during the cure in this same fixture or in another fixture and to the same or to approximately the same, intermediate diameter.

After one inner face has had the sealing material forced into place by a laterally applied pressure (and before the cure), the ring is taken out and turned upside down, the second layer of soft sealing elastomer is put in place, and the forcing-in process is repeated.

FIGURE 2 shows another variation or embodiment of the sealing means as applied to the same oil-control piston ring as in FIGURE 1. Here the ring is considered as being held in a cylinder bore or is in its installed condition like FIGURE 1. As shown in this second form, the ring 5a has its segments 8a interconnected by the bonded in sealing elastomer in the slits 11a and 12a and by an interconnected, inner face layer 15a with inward bulges 15'a which only extends approximately halfway in from the radially outer surfaces of the ring to match the sealed lengths of the slits.

As also indicated in this figure, even with the ring in its compressed or installed condition, it is preferred that the sealing elastomer extend completely out to (or tightly abut against) the cylinder bore and to the piston groove side wall but these complete closures are not essential in all cases in order to obtain a major part of the benefits of this invention. Very small oil leakage permitting gaps (as at 16a and 19a or 20a) will be partly closed by oil under capillary action. Also, only a substantial or a material reduction in oil leakage may suffice in certain cases.

Thus, as shown here, the radially outer ends 19a of the slit sealing material are slightly inward from the outer surfaces of the ring, as is the radially outer boundary of the continuous layer 15a. Similarly, the sealing elastomer is shown as not extending quite all the way down into the slits so that its outer edges (as shown at 20a) are not quite coextensive with outer or side faces.

It will be understood that this form may be made by various processes and in various types of apparatus, including that described in connection with FIGURE 1. In this connection, it will be noted that a very thick or viscous sealing material will, if laid in a strip or tape only along the radially outer portions of the inner faces, be forced only into the adjacent and radially outer portions of the slits due to its thickness. Thus it will not be materially forced into the radially inner portions of the slits.

FIGURE 3 shows a third variation or form of the sealing means as applied to a ring identical to that of FIGURE 1 and held compressed to a diameter similar to the installed diameter of FIGURE 1. However, in this FIGURE 3, the ring is not confined in a cylinder bore.

The ring 5b has its segments 8b interconnected by sealing elastomer bonded in the slits. In this case, the sealing material in the slits extends inward slightly more than half of the radial length of the slits.

As shown here, the sealing material of the slits, due to the compression of the ring to its installed diameter, is shown as squeezed out on all sides as indicated in an exaggerated manner at 15b, 19b and 20b. As shown at 15b, there may be separate or disconnected and limited areas of sealing material in films bonded on to the inner faces and integral with slit elastomer to add to the bonded areas but not to add the extra spring action of a continous elastic strip.

It will be understood that this form of FIGURE 3 may be made by any of various suitable methods, including the apparatus and method of FIGURE 1, except that the previously applied sealing elastomer is put on in a thinner layer only along the radially outer portion of the inner faces (or only adjacent to the outer ends of the slits) so that all, or substantially all, of it is forced into the slits by suitably higher pressure. These outwardly projecting portions, and particularly at 20b and 19b, may be left on in certain applications if they do not stick out too far to be forced in by the resilient ring engagement with the cylinder bore and the engagement with the ring groove sides. They may also be permitted to wear down in service as noted above.

However, this FIGURE 3 is also intended to illustrate and indicate that these outwardly projecting portions, at least at 19b and 20b, may be suitably cut or machined away or removed by other means while the ring is held compressed to its installed diameter or approximately so. This will provide flush surfaces to engage against the cylinder bore and also to engage the ring groove sides in the installed condition without any additional or squeeze out pressures and will permit perfect initial seating of the ring at these two surfaces.

It is to be understood that various other applications, forms, or modifications may be effected under the teach-

I claim as my invention:

1. The method of manufacturing a sealed, segmental, resiliently expansible and two material, piston ring comprising providing a metal ring part having resiliently connected, circumferentially spaced segments with narrow slits therebetween with said segments each having an outer side face to engage a piston ring groove side and an inner side face, cleaning and degreasing said part, coating at least the radially outer portions of said inner side faces and said slits with an adhesion producing primer, applying in flowable form on at least the radially outer portions of said inner side faces an uncured plastic material which is resistant to fuel, oil and engine temperature and is rubber-like and yieldably resilient when cured, then pressing said flowable material into said slits from said inner faces and heat curing and bonding it in place.

2. In the manufacture of a sealed piston ring part, the steps of providing a resiliently expansible, segmental, circular piston ring part having metal segments spaced by radially extending slits to open and close peripherally upon expansion and contraction of said part with said segments each having a side face and a radially outer face, applying on said side faces an elongated continuous layer of uncured sealing material in a soft flowable state, said sealing material being resistant to fuel, oil and engine temperature and being rubber-like and yieldably resilient when cured, applying pressure transverse to said side face to press and force said flowable sealing material from said faces into said slits and then hot curing and bonding said sealing material in place to substantially fill at least the radial outer portions of said slits.

3. The method of manufacturing a sealed, segmental, resiliently expansible, two material, piston ring comprising the steps of providing a resilient metal ring part having two connected, axially spaced, rail portions each having resiliently connected, circumferentially extending segments with narrow spaces therebetween with said segments each having an outwardly facing side face and an inwardly facing inner side face, applying a separate layer of flowable uncured and engine environment resistant sealing material, which is rubber-like and yieldably elastic when cured, to each of said inner faces, applying pressures in opposite and outward directions to said material on said two inner faces to force it into said spaces to substantially fill at least their radially outer portions and then heat curing and bonding said material in position.

4. In the manufacture of a sealed piston ring, the method comprising the steps of providing an expansible, circular, metal piston ring part having resiliently biased apart portions with spaces therebetween to resiliently resist closing of said spaces upon circumferential compression of said ring part from its larger free state diameter to its smaller service diameter when installed in a cylinder bore, substantially filling at least the radially outer portions of said spaces with a flowable, elastomer material having a yieldably resilient form and bonding in place and setting said material into its yieldably elastic form while holding said ring part only partially compressed to a smaller diameter which is greater than its said service diameter whereby said bonded and yieldably resilient sealing material is under compression between said portions in service.

5. In the manufacture of a sealed piston ring, the steps of providing a circular, expansible, steel piston ring part having a large number of cylinder bore engaging segments with smaller and capillary width slits therebetween resiliently connected to resist closing of said slits upon circumferential compression of said ring part from its larger free state diameter to its smaller service diameter when installed in a cylinder bore, filling under hydraulic pressure substantially the entire volumes of said capillary width slits with a flowable elastomer material having a yieldably resilient form and bonding in place and vulcanizing said material into its yieldably resilient form to substantially fill said slits while holding said ring part only partially compressed to a smaller diameter which is greater than its said service diameter whereby said bonded and yieldably resilient sealing material is held by surface tension and capillary forces, is under compression between said segments in service and is in tension between said segments when the finished part is in its expanded free state prior to installation.

6. In the manufacture of a sealed piston ring the method comprising the steps of providing a segmental and resiliently and circumferentially expansible piston ring part having resiliently connected and radially extending segments with axial side faces, said segments being circumferentially spaced by smaller width slits, applying a flowable elastomer material only to the radially outer portions of the axial side faces of said segments, applying pressure transverse to said side faces to force said material into only the radially outer end portions of said slits to provide independent and separate bodies of sealing material in said slits and then bonding in place and converting said material into its yieldably elastic form to provide a sealed piston ring part.

7. In the manufacture of a sealed piston ring the method comprising the steps of providing a segmental and resiliently and circumferentially expansible piston ring part having resiliently connected and radially extending segments with axial side faces, said segments being circumferentially spaced by smaller width slits, applying a flowable state elastomer material only to the radially outer portions of said axial side faces of said segments, applying pressure transverse to said faces to force only part of said material from said faces into only the radially outer portions of said slits to leave layer portions of said material on said faces integrally connected between the sealing material in said slits and then bonding in place and converting said material into its yieldably elastic form to provide a sealed piston ring part.

8. In the manufacture of a sealed piston ring, the steps of providing a resiliently expansible, segmental steel piston ring part having radially extending slits between cylinder bore engaging segments which peripherally open and close as the ring part expands and contracts, substantially sealing the radially outer portions of said slits by substantially filling them with, and bonding in place, a yieldably elastic sealing elastomer while said ring part is compressed to a diameter larger than its service diameter whereby said sealing elastomer is squeezed out when said ring part is compressed to its installed diameter and removing such squeezed out, sealing elastomer while holding said ring part at substantially its installed diameter to provide a substantially flush and piston bore engaging surface of sealing elastomer when said ring is installed.

9. In the manufacture of a sealed piston ring, the steps of providing a resiliently expansible, one-piece steel piston ring of outwardly convex U-shaped cross-section having alternately spaced slits through its two side rails, applying sealing elastomer in a flowable state to at least the radially outer portions of the two inner faces of said side rails, applying oppositely and outwardly directed pressures to force said sealing elastomer into and to substantially fill at least the radially outer ends of said slits and heat curing and converting said sealing elastomer in place into a yieldable resilient form bonded into said slits.

10. A packing member comprising an annular metal body composed of a plurality of interconnected segments adapted to have relative motions toward and away from each other and having spaces therebetween permitting said relative motions and providing potential leakage paths between said segments, and an elastomer in said spaces bonded to and between adjacent segments to seal substantially all of said potential leakage paths between said segments.

11. A packing ring which comprises a metal annulus composed of a plurality of circumferential segments adapted to have relative motions toward and away from each other for accommodating expansion and contraction of the annulus, each segment having a surface to sealingly engage a wall in normal use, said segments having spaces therebetween to permit their said relative motions, said spaces having portions extending to their said wall engaging surfaces and providing potential leakage paths, and elastomeric material bonded between said segments at least in the said wall engaging portions of all such spaces to substantially seal off all said potential leakage paths between said segments.

12. A resiliently expansible piston ring having a plurality of relatively movable metal parts each having at least a surface to engage a wall, said parts having expansible movement permitting spaces therebetween extending at least to said engaged wall, and softer but yieldably elastic material, which is resistant to engine environmental conditions, interconnecting said parts and located in all such spaces at least in their portions adjacent to said engaged wall to substantially seal against leakage through such wall engaging portions of said spaces.

13. A piston ring having a plurality of resiliently expansible and relatively movable metal parts having radially outer, cylinder bore engaging portions with motion permitting spaces therebetween, at least said radially outer portions of said parts being bonded to, and interconnected by, softer but yieldably elastic material in at least said radially outer portions of all of such spaces adjacent said cylinder bore to provide suction oil leakage sealing means for said radially outer portions of said spaces, said elastic material being resistant to engine environmental conditions and being compressively stressed in the installed, compressed condition of said ring.

14. A resiliently expansible piston ring including a plurality of metal members movable relative to each other upon expansion and contraction of said ring in service and each said member having a cylinder bore engaging surface and a piston ring groove side wall engaging surface, said members having relative motion permitting spaces therebetween extending radially and to said two surfaces, and yieldably elastic and rubber-like sealing material in and substantially filling at least the portions of all of such spaces adjacent said cylinder bore and said piston ring groove side wall to seal them against oil leakage therethrough, said sealing material being bonded to said members, being compressed by said members towards their expanded positions in service and being stressed by relative movements between said members.

15. A piston ring comprising resiliently expansible, circularly extending, and peripherally spaced, metal segments having cylinder bore engaging surfaces and having yieldable elastomer material bonded in all of their spaces between said segments in at least the cylinder bore engaging portions thereof to substantially seal all said portions of said spaces against oil leakage therethrough.

16. A resiliently expansible piston ring comprising, in combination, circularly extending and resiliently connected, metal segments each having a cylinder bore engaging surface and at least one non-cylinder bore engaging surface, said segments having spaces therebetween extending substantially radially to said cylinder bore to open and close upon expansion and contraction of said ring, yieldably elastic sealing material secured in only the radially outer portions of all such spaces adjacent said cylinder bore to substantially seal said portions against oil leakage therethrough and a layer of said same sealing material extending across and connected to said non-cylinder bore engaging surfaces of said segments integrally connected to sealing material in said spaces, all of said sealing material being in compression when said ring is installed and in service.

17. A piston ring comprising, in combination, two axially spaced and circularly extending walls of cylinder bore engaging and resiliently interconnected segments each having a cylinder bore engaging surface and at least one non-cylinder bore engaging surface, said segments having spaces therebetween which open and close upon expansion and contraction of said circular walls and which extend radially out to the cylinder bore, yieldably elastic, sealing material bonded in place in, and substantially filling the radial lengths of, all such spaces including their portions adjacent the cylinder bore and additional such sealing material bonded in place on said non-cylinder bore engaging surfaces of each of said two walls and integrally connected to said sealing material in said spaces of said walls.

18. A piston ring comprising, in combination, at least one resiliently expansible, circular rail of a plurality of cylinder wall engaging, and piston groove side wall engaging metal segments having spaces therebetween extending generally radially out to the cylinder wall and to the piston groove side wall, yieldably elastic, rubber-like sealing material which is resistant to engine environmental conditions bonded in place only in the radially outer cylinder bore engaging and piston groove side wall engaging portions of all such spaces between said segments to substantially seal said portions against oil leakage therethrough, said sealing material being substantially coextensive with the cylinder bore and with the piston groove side wall surfaces of said segments in service.

19. A resiliently expansible and contractible, one-piece, piston ring of the general type having a cross-section of a radially outwardly open U-shape having upper and lower U-leg sides each to engage the cylinder bore and also a ring groove side and radially inner oil drainage openings in the inner base of said U-shape, said U-leg sides each having alternately spaced slits extending radially therethrough to said cylinder bore and to said ring groove side and rubber-like sealing material bonded in at least the cylinder wall and the ring groove side engaging portions of said slits to substantially seal each of these portions against oil leakage therethrough.

20. A resiliently expansible and contractible, one-piece, piston ring of the general type having a cross-section of a radially outwardly open U-shape having radially inner oil drainage openings and having alternately spaced slits extending radially through each of its two otherwise substantially continuous, U-leg, sides and rubber-like sealing material bonded in, and sealing, at least the radially outer portions of said slits, said sealing including integrally connected portions bonded to the inner side faces of said U-leg sides.

21. A resiliently expansible and contractible, one-piece, piston ring of the general type having a cross-section of a radially outwardly open U-shape having upper and lower U-leg sides to engage the cylinder bore and the ring groove sides, said U-leg sides each having spaced slits to permit expansible and contractible motions said slits extending at least to said ring groove wall engaging surface of said U-leg and out to said cylinder bore and rubber-like sealing material bonded in, and sealing, at least the radially outer portions of said slits adjacent said engaged ring groove side wall to substantially prevent leakage past said ring and side wall through said portions of said slits.

References Cited in the file of this patent

UNITED STATES PATENTS

| | | |
|---|---|---|
| 2,169,613 | Niederlehner | Aug. 15, 1939 |
| 2,472,540 | Meador | June 7, 1949 |
| 2,626,193 | Patterson | Jan. 20, 1953 |
| 2,673,770 | Shirk | Mar. 30, 1954 |
| 2,764,458 | Ward et al. | Sept. 25, 1956 |